United States Patent [19]

Julinot

[11] Patent Number: 5,173,312
[45] Date of Patent: Dec. 22, 1992

[54] INJECTION UNIT FOR PLASTIC INJECTION MOLDING MACHINE

[75] Inventor: Helmut Julinot, Sharon, Canada

[73] Assignee: Husky Injection Molding Systems Ltd., Bolton, Canada

[21] Appl. No.: 777,485

[22] Filed: Oct. 15, 1991

Related U.S. Application Data

[63] Continuation of Ser. No. 569,649, Aug. 20, 1990, abandoned.

[51] Int. Cl.⁵ .............................................. B29C 45/18
[52] U.S. Cl. .................................... 425/145; 425/542
[58] Field of Search ................ 425/145, 149, 150, 542

[56] References Cited

U.S. PATENT DOCUMENTS

| | | | |
|---|---|---|---|
| 3,319,298 | 5/1967 | Kiraly | 425/145 |
| 3,767,339 | 10/1973 | Hunkar | 425/149 |
| 4,349,324 | 9/1982 | Neff et al. | 425/149 |
| 4,731,005 | 6/1988 | Hehl | 425/542 |

*Primary Examiner*—Tim Heitbrink
*Attorney, Agent, or Firm*—Bachman & LaPointe

[57] ABSTRACT

A plastic injection molding machine includes a quill secured to a plasticizing screw for rotatably driving the plasticizing screw. A quill insert is provided between a rotating motor ouptut and the quill to affect rotational movement of the plasticizing screw. An injection piston for axially displacing the quill and plasticizing screw is mounted on the quill so as to allow the quill to freely rotate within the injection piston.

3 Claims, 4 Drawing Sheets

INJECTION UNIT FOR PLASTIC INJECTION MOLDING MACHINE

This is a continuation of co-pending application Ser. No. 569,649 filed on Aug. 20, 1990 now abandoned.

BACKGROUND OF THE INVENTION

The present invention relates to a plastic injection molding machine and, more particularly, a plastic injection molding machine having a plasticizing unit and an injection unit.

Plastic injection molding machines typically employ plasticizing units and injection units for injecting resin into a mold. The plasticizing unit includes a heated cylinder which receives a plasticizing screw which is capable of rotational and axial movement inside the heated cylinder. Pellets of plastic are introduced into the heated cylinder and melted therein. Rotation of the plasticizing screw forces the pellets along the length of the heated cylinder until they form a pool of melted resin in front of the tip screw. A check valve provided on the screw tip prevents backflow of the melted resin as the screw is axially advanced into the cylinder by the injection unit thereby causing the resin to be forced out of the nozzle in the end of the heated cylinder. The nozzle on the end of the heated cylinder is sealed against the sprue bush of a mold and the action of forcing the resin into the mold is called plastic injection. Typically during the operation of the plastic injection molding machine the plasticizing screw in the cylinder, which both rotates and slides, develops high injection pressures typically in the area of 30,000 psi.

There have been various designs for the plasticizing and injection units of plastic injection molding machines in order to enable the plasticizing screw to both rotate and axially move within the heated plasticizing cylinder. A typical device is described and illustrated in U.S. Pat. No. 4,731,005 to Hehl. In the arrangement of the Hehl patent as best shown in FIG. 3, the injection piston 58 of the injection unit has the motor 63 attached directly to it for rotating the plasticizing screw. The motor in turn drives a quill 64 which is attached to the plasticizing screw 14. As the motor 63 rotates, the plasticizing screw 14 is driven via the quill 64 through a series of fixed couplings. As the pool of melted resin builds up in the front of the plasticizing screw 14, the screw is pushed toward the right along with the injection piston 58 which slides inside injection cylinder 57. Thrust bearing 55 permits this back force to the injection piston while permitting the screw 14 to rotate. When sufficient resin has been plasticized, motor 63 is stopped in order to stop rotation of the plasticizing screw 14 and high pressure fluid is delivered into the injection cylinder 57 and acts on the righthand side of the injection piston 58 which causes the injection piston 58, the quill 64 and the plasticizing screw 14 to be moved to the left so as to inject the plastic resin from the cylinder and into a mold. As can been seen from the foregoing discussion and particularly FIG. 3 of the Hehl patent, the motor 63 reciprocates back and forth with the screw and the injection piston 58. As a result of the fact that the motor is fixed to the injection piston and reciprocated therewith, the weight and inertia of the motor increases the wear on the bearings and seals of the assembly which is highly disadvantageous. In addition, a complicated attachment is required from the power supply to the reciprocating motor 63.

A similar arrangement is shown in U.S. Pat. No. 4,349,324 to Neff et al. where plasticizing screw 2 is rotated by motor 3 which in turn is mounted on injection piston 9 mounted inside injection cylinder 8.

FIG. 1 illustrates a different arrangement known in the prior art. As shown schematically in FIG. 1, the plasticizing screw 1 is directly mounted to a injection piston 2 which is provided with a bore having a spline which slides along a corresponding spline on quill 3. The quill 3 is rotated by motor 4 which is mounted on the stationary injection cylinder 5 and, therefore, does not reciprocate with the plasticizing screw 1. Upon rotation of the motor 4, the quill 3 is rotated and in turn rotatably drives injection piston 2 via the spline connection for imparting rotation to the plasticizing screw 1. A severe disadvantage of the arrangement of the prior art mechanism described in FIG. 1 is that the injection piston rotates at the same speed as the screw as well as reciprocating within injection cylinder 5 when injecting the melted plastic resin. Thus, the seals on the injection piston are subjected to very high wear from both the rotating and sliding action of the injection piston 2 within the injection cylinder 5.

A further known arrangement is shown in FIG. 2 of the instant application which is an arrangement employed by the assignee of the instant invention. In the design shown in FIG. 2, the plasticizing screw 1 is connected to quill 3. The quill 3 is in turn mounted within a quill insert by corresponding matching splines and the quill insert is connected to the output shaft of the motor 4. A large thrust bearing 6 and forward bearing 9 on the quill support the assembly inside the injection piston 2 which slides within injection cylinder 5. A sleeve 10 is provided around a portion of quill 3 and quill insert 8 and the injection piston 2 slides in sealing engagement on the sleeve 10. The sleeve 10 separates the hydraulic fluid used in driving the injection piston 2 from the lubricating oil used for lubricating corresponding splines 7 and bearings 6 and 9. Thus, the arrangement of this mechanism has the advantage of employing a stationary motor, large thrust bearings and having the thrust bearings exposed to lubricating fluids so as to improve the life thereof. The arrangement, however, does suffer from the disadvantage that the overall length of the assembly from the feeder tube 11 to the motor 4 is excessively long.

Naturally, it would be highly desirable to provide a plastic injection molding machine which overcomes the deficiencies noted above with regard to the prior art.

Accordingly, it is a principal object of the present invention to provide a plastic injection molding machine wherein excessive wear on the seals of the injection piston is avoided.

It is a further principal object of the present invention to provide a plastic injection molding machine as aforesaid wherein the thrust bearings which transmit force to the injection piston are continually lubricated with lubricating oil.

It is a still further object of the present invention to provide a plastic injection molding machine wherein the motor for rotating the plasticizing screw is fixed to the ejection unit housing.

It is a still further object of the present invention to provide a plastic injection molding machine as aforesaid which is not of excessive length.

Further objects and advantages of the present invention will appear hereinbelow.

SUMMARY OF THE INVENTION

In accordance with the present invention the foregoing objects and advantages are readily obtained.

The present invention relates to a plastic injection molding machine and, more particularly, a plastic injection molding machine having a plasticizing unit and an injection unit.

In accordance with the present invention, the plasticizing unit includes a plasticizing screw which is rotatably and axially movable within a cylinder. A quill is provided which has one end fixed to the plasticizing screw and the other end of which is provided with a bore having an internal spline. A quill insert has an external spline on the external surface thereof which is received within the bore of the quill. One end of the quill insert is connected to a motor which, upon rotation, imparts rotational motion to the quill insert and correspondingly the quill and the plasticizing screw. The motor is fixed to the housing of the plastic injection molding machine. In accordance with a particular feature of the present invention, the injection piston is mounted on the quill within an injection cylinder and is axially fixed on the quill in a manner such that the quill is free to rotate within the injection piston without the rotation of same. By providing a structure as aforesaid, the injection piston axially moves the quill for injecting molten resin into a mold and at the same time allows for the plasticizing screw to be freely rotatable independent of the injection piston. In addition, by having an arrangement wherein the ejection piston and quill are slidable over a quill insert, the overall length of the injection molding machine is maintained within desired dimensions.

Further objects and advantages of the present invention will appear hereinbelow.

DETAILED DESCRIPTION

Figure 1:
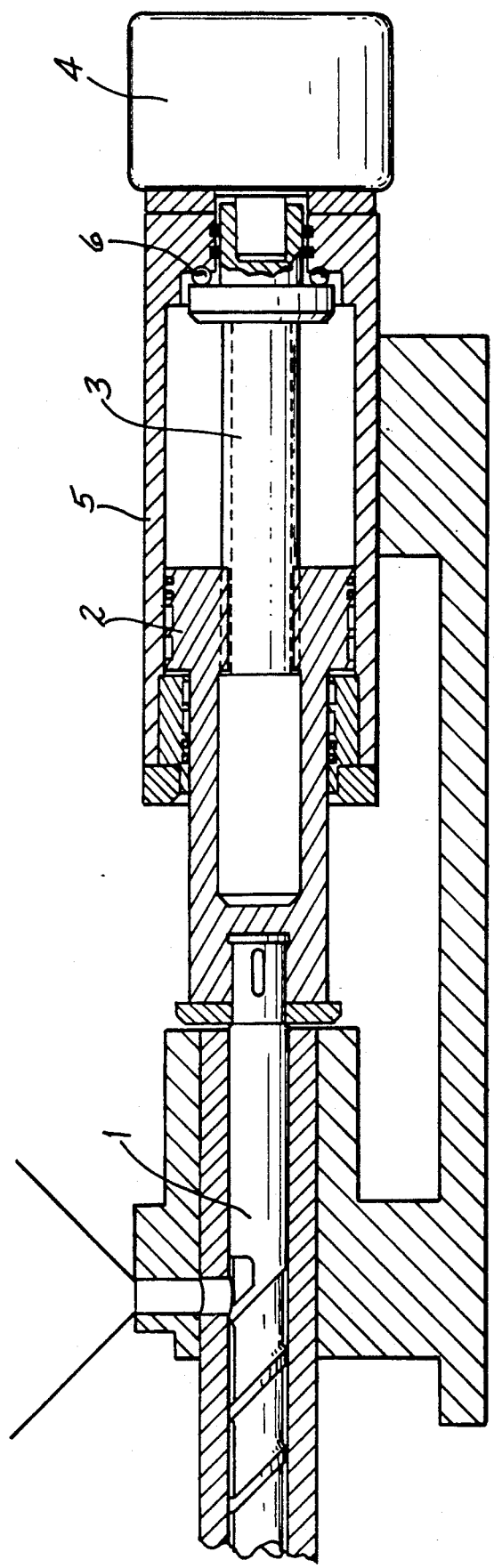
FIG. 1 is a schematic illustration of the plasticizing unit and injection unit of a prior art plastic injection molding machine.
Figure 2:
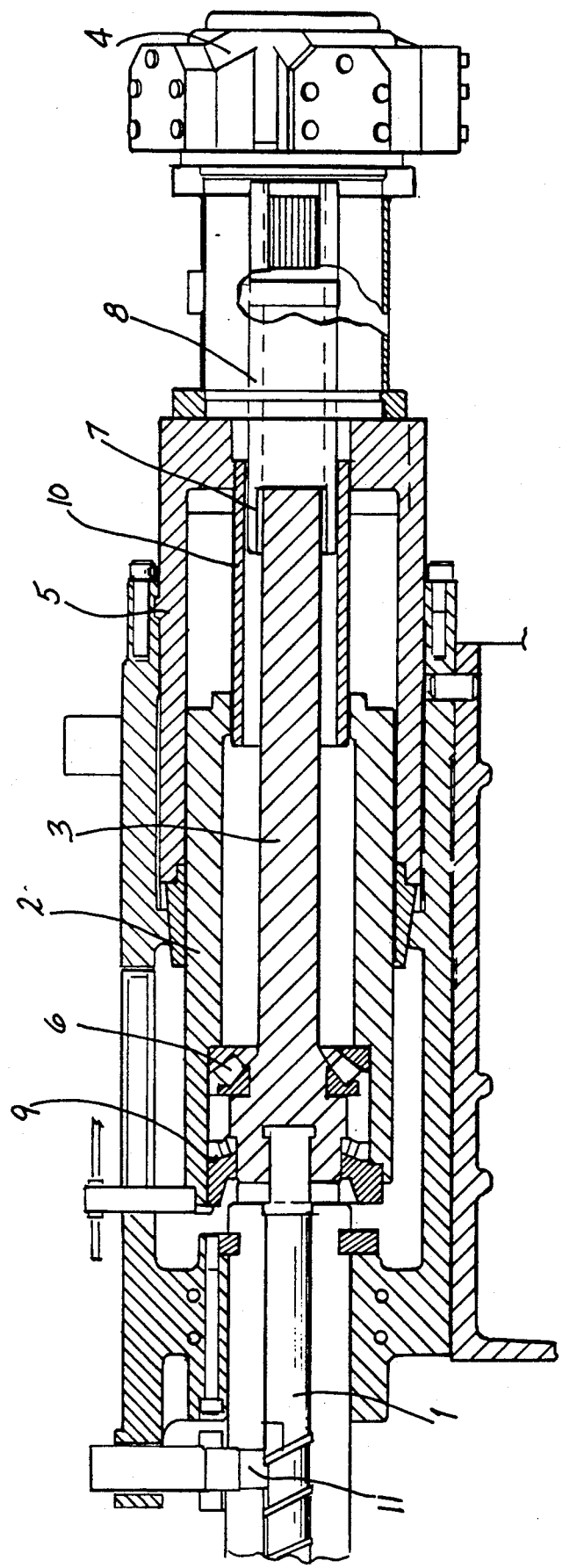
FIG. 2 is an illustration of a further prior art plastic injection molding machine showing the arrangement of the plasticizing unit and injection unit.
Figure 3:
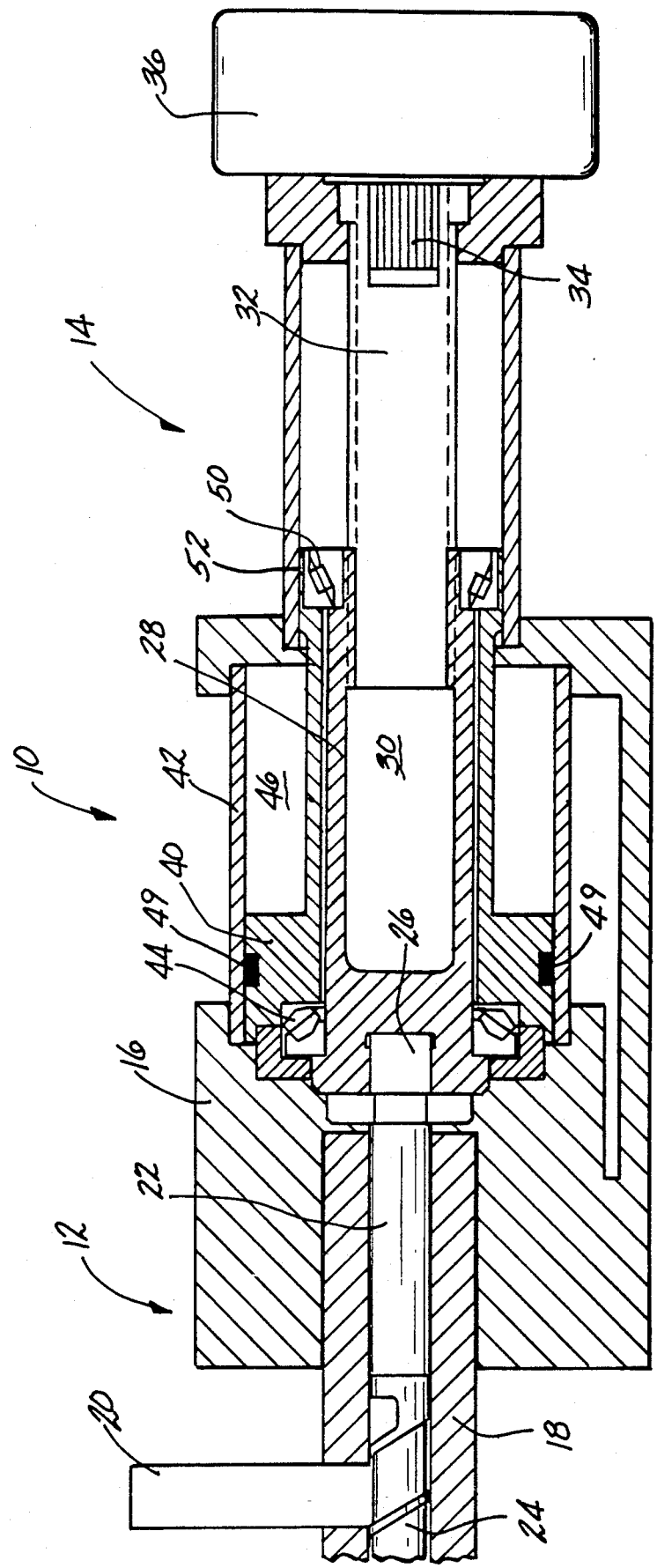
FIG. 3 is a schematic illustration of the plastic injection molding machine of the present invention in its forward position.
Figure 4:
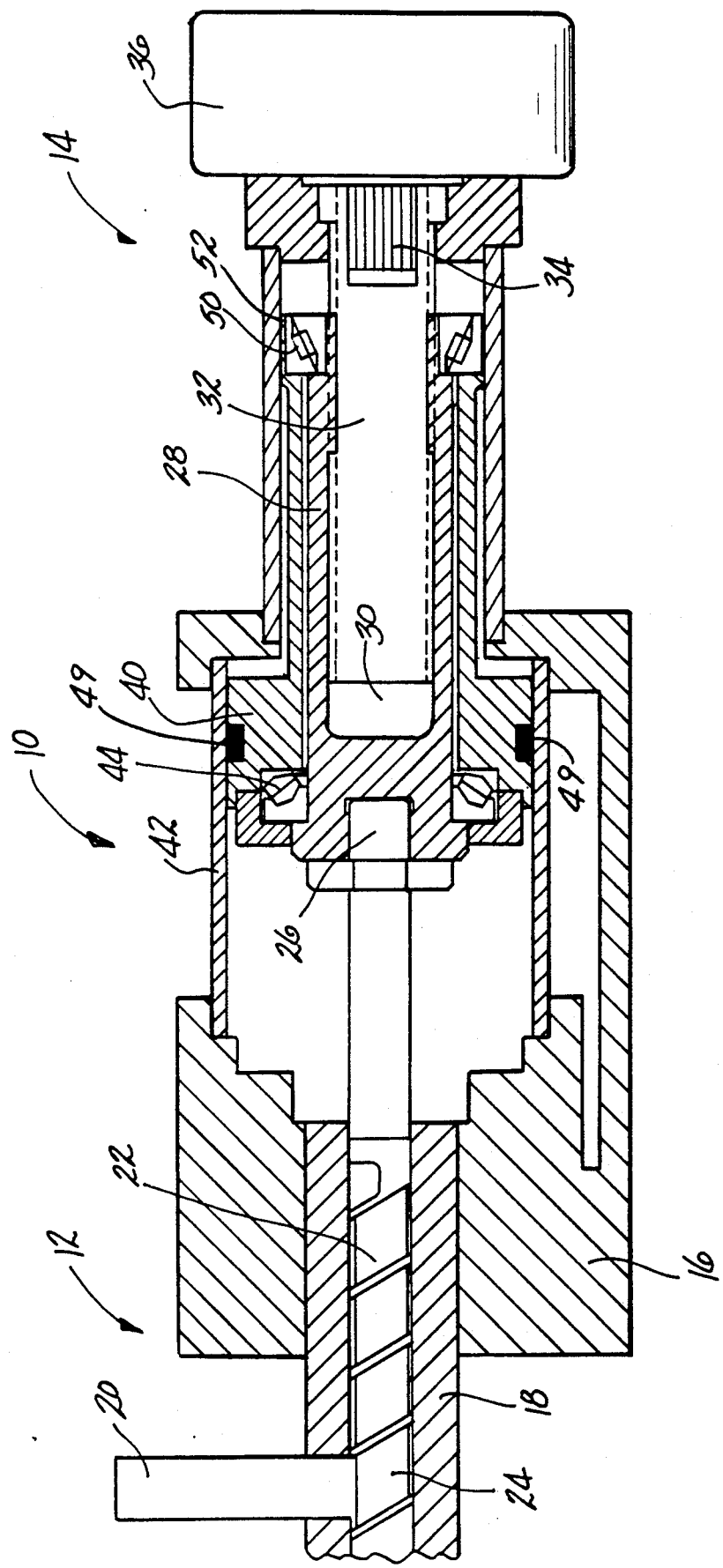
FIG. 4 is a schematic illustration of the plastic injection molding machine of the present invention in its withdrawn position.

With reference to the drawings, and particularly FIGS. 3 and 4 of the drawings, a plastic injection molding machine 10 comprises a plasticizing unit 12 and an injection unit 14 mounted in an injection molding housing 16. The plasticizing unit 12 comprises a cylinder 18 which, typically, is heated by means not shown and an inlet hopper 20 for feeding plastic pellets to the cylinder. A plasticizing screw 22 is mounted within the cylinder for rotational and axial movement therein.

The plasticizing screw includes a screw portion 24 and a shank portion 26 which is received in a quill 28 and secured therein for rotational and axial movement therewith. The connection between the screw shank and quill can be of any known variety shown in the foregoing prior art patents and specifically may be in the form of a quick disconnect coupling of the type illustrated and described in co-pending application Ser. No. 502,748, now U.S. Pat. No. 5,011,396 which is assigned to the assignee of the instant application.

As noted above, quill 28 is provided on one end thereof with a mechanism for securing thereto the shank portion 26 of plasticizing screw 22. The quill on the other end thereof is provided with a bore 30 which has an internal spline on the surface thereof. The depth of the bore 30 is chosen to be of sufficient length so as to allow for ejection of the pool of melted resin from the screw tip in the manner previously described above.

Quill 28 receives within the bore 30 a quill insert 32 which is provided on the external surface thereof with a spline corresponding to the spline provided on the internal surface of bore 30 of quill 28. Quill insert 32 is connected to output 34 of motor 36 which imparts rotation to the quill insert 32 and correspondingly to quill 28 and plasticizing screw 22. The motor 36 is fixed to the housing of the injection molding machine in a stationary manner.

An injection piston 40 is mounted within an injection cylinder 42 about quill 28 and is axially fixed on the quill 28. Thrust bearings 44 are carried by the quill and act on the injection piston 40 so as to allow the quill 28 to rotate independently of the injection piston 40. Seals are provided on the outer periphery injection piston 40 for sealing the piston 40 against injection cylinder 42. An additional thrust bearing 50 is provided between an extension 52 of piston 50 and quill 28. Thrust bearing 44 stabilizes the injection piston and thereby increases the life of the seals 49 provided on piston 40 between the piston and cylinder 42.

The operation of the plastic injection molding machine of the present invention is similar to that disclosed above with regard to U.S. Pat. No. 4,731,005. Motor 36 rotates the plasticizing screw 22 through quill insert 32 and quill 28. Plastic pellets are fed to cylinder 18 via hopper 20. As the plastic pellets melt, a pool of molten resin builds up in front of the plasticizing screw which causes the plasticizing screw 27 to be moved backward (toward the right in the figure) along with the injection piston 40 which slides within injection cylinder 42. Thrust bearing 44 transmits this backward force to the injection piston 40 while allowing the plasticizing screw 22 to rotate. When sufficient resin has been plasticized, rotation of the plasticizing screw is stopped and high pressure hydraulic fluid is fed to chamber 46 which acts on injection piston 40 causing the injection piston 40 to move to the left within quill 28 and plasticizing screw 22 which results in the injection of the molten resin from the cylinder 18 to a mold.

The arrangement of the plasticizing unit and injection unit of the injection molding machine of the present invention as described above is advantageous over prior art systems in that wear on the seals of the injection piston and thrust bearings is greatly reduced and the overall length of the injection molding machine is kept within desired dimensions.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding machine comprising:

a plasticizing unit having a plasticizing screw mounted within a cylinder;

a quill having a first end fixed to said plasticizing screw and a second end provided with a bore;

a quill insert having an external surface received within said bore of said quill;

motor means connected to an end of said quill insert for rotating said quill insert, said quill and said plasticizing screw;

an injection piston mounted on said quill within an injection cylinder, said injection piston being axially fixed on said quill in a non-rotatable manner therewith;

seals positioned between said injection piston and said injection cylinder;

said injection piston including an extension portion projecting therefrom and having an end terminating at the second end of said quill;

means for reciprocating said injection piston within said injection cylinder for imparting reciprocating motion to said quill and said plasticizing screw;

first thrust bearing means provided on said quill proximate to said first end of said quill between said quill and said injection piston for allowing said quill to rotate independently of said injection piston; and second thrust bearing means for stabilizing the injection piston and for increasing the life of the seals, said second thrust bearing means being provided on said quill proximate to said second end of said quill and between said quill and said end of said extension portion of said injection piston.

2. An injection molding machine according to claim 1 wherein the bore of the quill and the external surface of the quill insert are provided with corresponding splines.

3. An injection molding machine according to claim 1 wherein the mold machine has a stationary housing and said motor means is fixed to said housing.

* * * * *